June 21, 1927.

A. COTE 1,632,821

ELECTRIC WATER HEATER

Original Filed April 30, 1923

Inventor
Alfred Cote
By
Attorney

Patented June 21, 1927.

1,632,821

UNITED STATES PATENT OFFICE.

ALFRED COTE, OF MONTREAL, QUEBEC, CANADA.

ELECTRIC WATER HEATER.

Application filed April 30, 1923, Serial No. 635,472. Renewed June 21, 1926.

The present invention relates to improvements in electric water heaters, and is hereinafter fully described and illustrated in the accompanying drawing, in which:—

Like numerals of reference indicate corresponding parts in each figure.

Referring to the drawings:—

Figure 1:
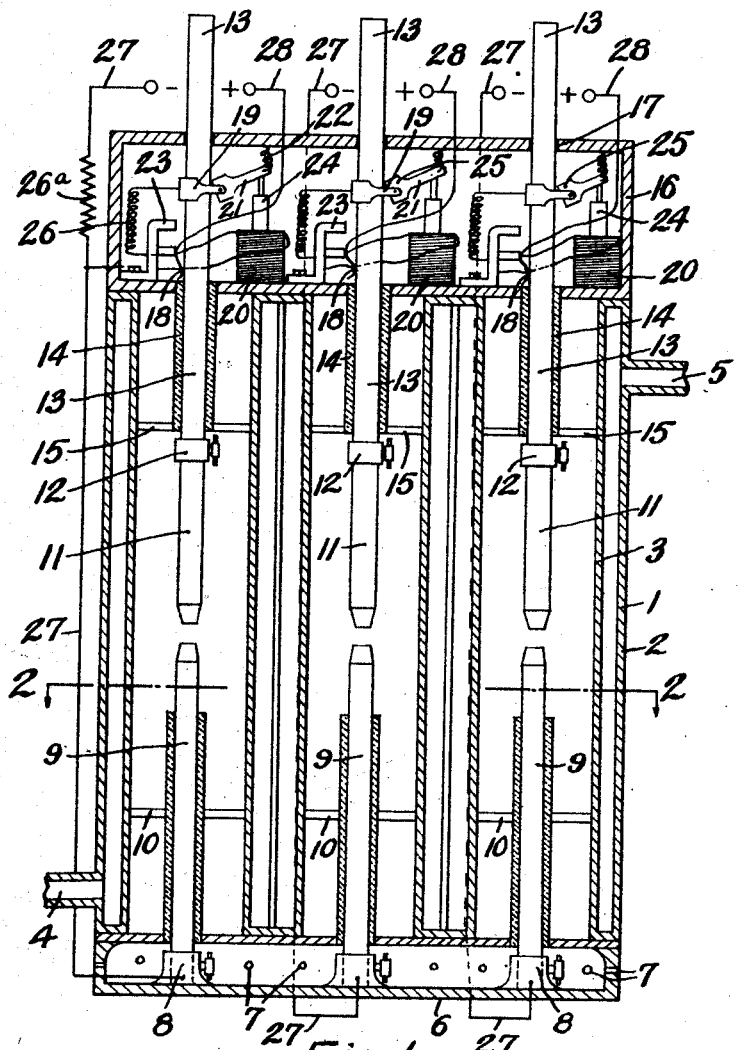
Figure 1 is a vertical sectional view of the invention.
Figure 2:
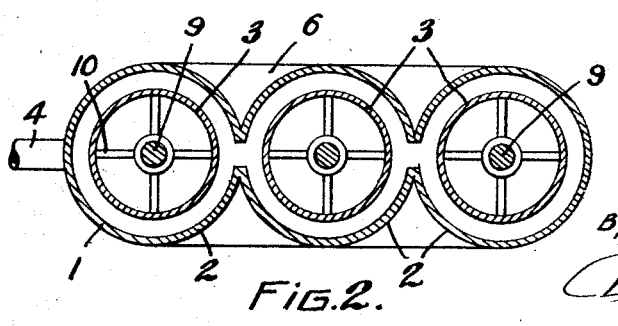
Figure 2 is a cross section on line 2—2 of Figure 1.

1 indicates a plurality of circular water casings preferably united together, as disclosed in Figure 2 of the drawing. Each water casing comprises an outer wall 2 and inner circular wall 3, the space provided between said walls 2 and 3 being closed at each end, but the space provided between the sides of the inner wall 3 being open at each end. 4 is a water inlet preferably provided adjacent the lower end of said casing 1, and 5 is the water outlet. The water enters through the pipe 4 and circulates between the walls 2 and 3 and finally goes out through the outlet 5.

On the lower end of said water casings 1 is provided a transverse casing 6, which is secured by any suitable means to the said casing 1, said casing 6 being provided with a plurality of air vents 7, and 8 indicates a plurality of stationary sockets in which are mounted the negative carbon rods 9. The said carbon rods 9 projecting through a suitable opening provided in the said casing 6, and extending partly within said inner casing 3. In order to prevent said carbons from breaking owing to their length, tubular members of any non-conductive material such as porcelain or the like are provided, said tubular members partly enveloping said carbons 9, and having the extension 10 projecting from each side thereof in order to center them and prevent their lateral movement. Oppositely mounted to said carbons 9, and in alignment therewith are provided the positive carbons 11, said carbons being preferably mounted in the sockets 12 provided in the lower ends of the sliding rods 13, said sliding rods preferably moving in the tubular members of any suitable non-conductive material 14, which are also provided with centering projections 15.

Above said water casings 1 is provided the control casing 16, which has on its upper side the holes 17 through which the sliding rods 13 project.

The device operating the said sliding rods is of the type commonly called "shunt lamp mechanism", the upper or positive carbon being held out of contact with the lower carbon by the spring 18 and the clutch 19, when the carbons are not in circuit. When it is connected to the circuit, the current flows from the positive terminal marked + through the solenoid 20 to the negative terminal. The solenoid being thus energized, draws down the lever 21 of the clutch shoe allowing the light helical spring 22 to draw down the body of the clutch until it strikes the trip 23 which prevents the main part of the clutch from going any lower; the solenoid plunger 24 continues downward however, tilting the shoe 25 on its pivot until it releases the sliding rod 13 and allows the carbon 11 to drop on the end of the lower carbon 9. The current immediately passes through the two carbons which short-circuits the solenoid and thereby prevents the spring 26 from pulling the carbons far enough apart to break the arc. A state of equilibrium is established when the arc is at normal length, the springs 26 and 22 being made adjustable for this purpose.

As the carbons burn away, the length of the arc is increased, thereby increasing the difference of potential across the carbons and consequently at the terminals of the solenoid winding, strengthening the solenoid and causing it to pull the clutch and carbon rod downward until equilibrium is again restored. This process, which is known as feeding, continues until the clutch has been pulled downward almost into contact with the tripping tongue 23. The next time that feeding becomes necessary by reason of the burning away of the carbon, the solenoid pulls the clutch downward, the body of it comes into contact with the trip 23, and as it cannot move any further downward the shoe 25 is tilted, releasing its grip on the sliding rod 13 and allowing the latter to feed. The feeding process is intermittent, but both the time intervals and the feeding of the carbon may be reduced to infinitesimal increments in a well built device, the adjustment being so delicate that the solenoid restores the arc to its normal length before the carbons have burned away sufficiently to cause the increase in arc length to be noticeable.

The resistance coil 26ª is necessary for two reasons; without it, the electro-motive force of the terminals of the solenoid 20 would be constant (the electro-motive force at the terminals being constant) and no regulation would be possible. With the resistance coil 26ᵃ in circuit, variations in the length of the arc cause corresponding variations in the difference of potential at the solenoid terminals. The resistance coil is also necessary for the purpose of steadying the arc. The resistance of an arc decreases with an increase of current and it is therefore impossible to maintain a steady arc on a constant-potential circuit without inserting an appreciable resistance in series with the arc. The resistance of ordinary conducting material increases as the temperature increases, and consequently an increase in current through the resistance coil will cause its resistance to increase slightly. This tends to compensate for the decrease in the resistance of the arc when the current increases, and vice versa.

Negative carbons 9 are preferably connected to the negative terminals by means of the electrical conductors 27 while the current flows from the positive terminals through the electrical conductors 28.

What I claim as my invention is:—

1. An electric water heater comprising a transverse casing provided with sockets; a plurality of water casings mounted on said transverse casing having inner and outer walls; a control casing mounted on the upper ends of said water casings and having a plurality of sliding rods therein; a negative carbon for each water casing mounted within said inner wall in the socket of said transverse casing; a positive carbon for each water casing mounted within said inner wall in the sliding rod, said carbons being in alignment with each other; and means in said control casing for operating each of said sliding rods in order to maintain an arc across the ends of the carbons.

2. An electric water heater comprising a transverse casing; a plurality of water casings mounted on said transverse casing each having inner and outer walls; a control casing mounted on the upper ends of said water casings and having a plurality of sliding rods therein; a negative carbon for each water casing mounted within said inner wall in said transverse casing; a positive carbon for each water casing mounted within said inner wall in the sliding rod; and means in said control casing for operating each of said sliding rods in order to maintain an arc across the ends of the carbons.

3. An electric water heater comprising a transverse casing; a plurality of water casings mounted on said transverse casing; a control casing mounted on said water casings and having a plurality of sliding rods therein; a negative carbon for each water casing mounted in said transverse casing; a positive carbon for each water casing mounted in said sliding rods; and means in said control casing for operating each of said sliding rods in order to maintain an arc across the ends of the carbons.

4. An electric water heater comprising a transverse casing; a plurality of water casings mounted on said transverse casing; a control casing mounted on said water casings and having a plurality of sliding rods therein; a clutch mounted on each sliding rod; a trip mechanism for each clutch; a solenoid and plunger for each rod, said plunger being connected to said clutch; a positive carbon for each water casing mounted in said sliding rods; a negative carbon for each water casing mounted in said transverse casing; and means for energizing each of said solenoids in order to maintain an arc across the ends of the carbons.

Signed at Montreal, Quebec, Canada, this 28th day of March, 1923.

ALFRED COTE.